(12) United States Patent
Tsai

(10) Patent No.: US 8,369,031 B2
(45) Date of Patent: Feb. 5, 2013

(54) SINGLE FOCUS WIDE-ANGLE LENS MODULE

(75) Inventor: Fei-Hsin Tsai, Tai-Chung County (TW)

(73) Assignee: Newmax Technology Co., Ltd., Wai Pu Hsiang, Tai-Chung County (TW)

( * ) Notice: Subject to any disclaimer, the term of this patent is extended or adjusted under 35 U.S.C. 154(b) by 94 days.

(21) Appl. No.: 12/974,838

(22) Filed: Dec. 21, 2010

(65) Prior Publication Data

US 2012/0154905 A1    Jun. 21, 2012

(51) Int. Cl.
- G02B 9/34 (2006.01)
- G02B 13/18 (2006.01)
- G02B 3/06 (2006.01)
- G02B 9/00 (2006.01)
- G02B 9/08 (2006.01)

(52) U.S. Cl. .................. 359/783; 359/715; 359/740

(58) Field of Classification Search ............... 359/715, 359/740, 753, 783, 650
See application file for complete search history.

(56) References Cited

U.S. PATENT DOCUMENTS 7,538,958 B2 * 5/2009 Tang ........................... 359/783

* cited by examiner

*Primary Examiner* — Alicii M Harrington
(74) *Attorney, Agent, or Firm* — Muncy, Geissler, Olds & Lowe, PLLC

(57) ABSTRACT

A single focus wide-angle lens module includes a fixed aperture diaphragm, a first, a second, a third and a forth lens arranged from an object side to an image side in the following sequence: the first lens, the fixed aperture diaphragm, the second lens, the third lens and the forth lens. The first lens has a negative refractive power, a concave surface toward the image side, and at least one aspheric surface. The second lens has a positive refractive power and a concave surface toward the object side, and said second lens is made of glass. Further, the third lens has a meniscus shape, a positive refractive power, a concave surface toward the object side, and at least one aspheric surface. The fourth lens has a positive refractive power, a convex surface toward the object side, and at least one aspheric surface.

8 Claims, 6 Drawing Sheets

Non-point aberration and distorted aberration

Spherical surface aberration

Focal length : f = 5.95 mm  $\frac{|f_2|}{|f_3|} = 0.198$  $\frac{|f_3|}{|f_4|} = 2.23$  $\frac{|f|}{|TL|} = 0.398$ (F NO.) : F 2.4

Viewing angle : 2ω = 70°  $\frac{|f_{12}|}{|f_{34}|} = 0.966$  $\frac{|f_{234}|}{|f|} = 0.909$

| Surf | Radius | Thickness | nd | Vd |
|---|---|---|---|---|
| OBJ | Infinity | Infinity | | |
| 1 | 3.782888 | 0.910971 | 1.632000 | 23.000000 |
| 2 | 3.428393 | 0.850864 | | |
| STO | Infinity | 0.281833 | | |
| 4 | -21.9601 | 2.560867 | 1.846663 | 23.784813 |
| 5 | -4.89814 | 1.909654 | | |
| 6 | -1.83238 | 2.499939 | 1.535000 | 56.000000 |
| 7 | -2.46029 | 0.1 | | |
| 8 | 3.978096 | 2.499962 | 1.535000 | 56.000000 |
| 9 | 5.801914 | 0.65 | | |
| 10 | Infinity | 0.7 | 1.516798 | 64.198266 |
| 11 | Infinity | 1.041491 | | |
| 12 | Infinity | 0.55 | 1.516798 | 64.198266 |
| 13 | Infinity | 0.39 | 1.516798 | 64.198266 |
| IMA | Infinity | | | |

SURFACE DATA DETAIL:

| Surface | 1 | | Surface | 2 | |
|---|---|---|---|---|---|
| K | : | 0.762394 | K | : | 2.622792 |
| A | : | 0.008860827 | A | : | -0.00720168 |
| B | : | -0.00101032 | B | : | 0.006012647 |
| C | : | 0.000259733 | C | : | -0.0005871 |
| D | : | -1.57E-05 | D | : | -0.0002323 |
| Surface | 6 | | Surface | 7 | |
| K | : | -1.65769 | K | : | -2.1301 |
| A | : | -0.00513758 | A | : | -0.01381783 |
| B | : | -0.00052396 | B | : | 0.001359212 |
| C | : | 0.000196175 | C | : | -0.0001112 |
| D | : | -5.50E-06 | D | : | 4.95E-06 |
| Surface | 8 | | Surface | 9 | |
| K | : | -3.60074 | K | : | -0.52108 |
| A | : | -0.00155153 | A | : | -0.0103789 |
| B | : | 3.26E-05 | B | : | 0.000510478 |
| C | : | 1.63E-06 | C | : | -1.37E-05 |
| D | : | -8.60E-08 | D | : | 1.09E-07 |

FIG. 1B

Non-point aberration and distorted aberration

Spherical surface aberration

Focal length : f = 5.95 mm $\quad \dfrac{|f_2|}{|f_3|} = 0.373 \quad \dfrac{|f_3|}{|f_4|} = 1.134 \quad \dfrac{|f|}{|TL|} = 0.4$ (F NO.) : F 2.4

Viewing angle : 2ω = 70° $\quad \dfrac{|f_{12}|}{|f_{34}|} = 1.305 \quad \dfrac{|f_{234}|}{|f|} = 0.882$

| Surf | Radius | Thickness | nd | Vd |
|---|---|---|---|---|
| OBJ | Infinity | Infinity | | |
| 1 | 4.168074 | 1.072826 | 1.632000 | 23.000000 |
| 2 | 3.269513 | 0.875402 | | |
| STO | Infinity | 0.449634 | | |
| 4 | -26.9545 | 1.676228 | 1.846663 | 23.784813 |
| 5 | -5.25094 | 2.288926 | | |
| 6 | -2.13608 | 2.496984 | 1.535000 | 56.000000 |
| 7 | -2.50469 | 0.1 | | |
| 8 | 3.956707 | 2.5 | 1.535000 | 56.000000 |
| 9 | 5.279736 | 0.8 | | |
| 10 | Infinity | 0.7 | 1.516798 | 64.198266 |
| 11 | Infinity | 1 | | |
| 12 | Infinity | 0.55 | 1.516798 | 64.198266 |
| 13 | Infinity | 0.39 | | |
| IMA | Infinity | | | |

SURFACE DATA DETAIL:

| Surface 1 | | Surface 2 | |
|---|---|---|---|
| K : | -0.22159 | K : | 2.390658 |
| A : | 0.00119558 | A : | -0.012074897 |
| B : | 0.000782204 | B : | 0.005197763 |
| C : | -1.78E-05 | C : | -0.00096882 |
| D : | -1.59E-05 | D : | -0.000418405 |
| Surface 6 | | Surface 7 | |
| K : | -2.14479 | K : | -2.06539 |
| A : | -0.004017359 | A : | -0.013600858 |
| B : | -0.001163573 | B : | 0.001274817 |
| C : | 0.000296462 | C : | -0.00010705 |
| D : | -1.37E-05 | D : | 4.65E-06 |
| Surface 8 | | Surface 9 | |
| K : | -4.93176 | K : | -0.21301 |
| A : | -0.002036989 | A : | -0.014250217 |
| B : | 3.41E-05 | B : | 0.000795315 |
| C : | 6.36E-06 | C : | -2.40E-05 |
| D : | -3.40E-07 | D : | 1.91E-07 |

FIG. 2B

SINGLE FOCUS WIDE-ANGLE LENS MODULE

BACKGROUND OF THE INVENTION

1. Field of the Invention

The present invention relates to the field of optical lenses, and more specifically to an image-sensing four-piece single focus lenses module which is applied for infrared receiving on a game device.

2. Description of the Prior Art

With the progress of digital imaging technologies nowadays, present digital carriers such as digital cameras and cell phones tend to be miniaturized. In this way, the sensors such as CCD or CMOS are also miniaturized. Infrared condensing lens are applied not only in the photography field, but also in the area of infrared receiving and sensing on game devices. Further, to extend the image-sensing range of the game devices, current single focus lens modules for receiving infrared wavelength are mostly the wide-angle lens modules with larger viewing angle.

The applicant also applied some single focus wide-angle lens modules about infrared receiving, but today's game devices mainly provide 3D games which are more stereoscopic and real. Current single focus wide-angle lens modules and the previous ones the applicant had applied which are used for 2D games so that said lens modules fail to satisfy the effect of longitudinal depth which is provided in 3D games.

Besides, some infrared receiving and sensing lens modules of game devices are made of plastics so as to reduce the production cost. In that way, the bad transmittance of a plastic lens results in inaccurate longitudinal depth sensing on game devices. Moreover, a focal length of the plastic lens modules is prone to be changed in an overheating or overcooling environment so that the focus detection is unable to be accurate. The mentioned above are the issues for the current single focus wide-angle lens modules failing to satisfy the effect of the longitudinal depth in 3D games.

Therefore, the present invention is arisen to obviate or at least mitigate the above mentioned disadvantages.

SUMMARY OF THE INVENTION

The main object of the present invention is to provide a single focus wide-angle lens module that can make infrared sensors have better image-sensing performance.

Another object of the present invention is to provide a four-piece single focus wide-angle lens module with accurate 3D image sensing for longitudinal depth.

Another object of the present invention is to provide a four-piece single focus wide-angle lens module with a larger detecting angle and better optical performance.

Also another object of the present invention is to provide a single focus wide-angle lens module whose chief ray angle approaching 0 degree.

To achieve the above and other objects, a single focus wide-angle lens module of the present invention includes a fixed aperture diaphragm, a first, a second, a third and a fourth lens, arranged from an object side to an image side in the following sequence: the first lens, the diaphragm, the second lens, the third lens and the fourth lens.

The first lens has a negative refractive power, a concave surface toward the image side, and at least one aspheric surface. The second lens has a positive refractive power, a concave surface toward the object side, and said second lens is made of glass. The third lens has a meniscus shape, a positive refractive power, a concave surface toward the object side, and at least one aspheric surface. Further, the fourth lens has a positive refractive power, a convex surface toward the object surface, and at least one aspheric surface.

Thereby, the detecting angle of the single focus wide-angle lens is expected to increase, and the chief ray angle of the lens module is expected to approach 0 degree. In addition to reaching the requirement of the chief ray angle approaching 0 degree, the present invention can detect longitudinal depth of an image more accurately and more clearly to satisfy 3D players' need for accurate instruction receiving and determining.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1B is a schematic view showing the data of optical features and aspheric coefficients of an imaging lens module in accordance with a first preferred embodiment of the present invention;

FIG. 2B is a schematic view showing the data of optical features and aspheric coefficients of an imaging lens module in accordance with a second preferred embodiment of the present invention.

DETAILED DESCRIPTION OF THE PREFERRED EMBODIMENTS

Figure 1:
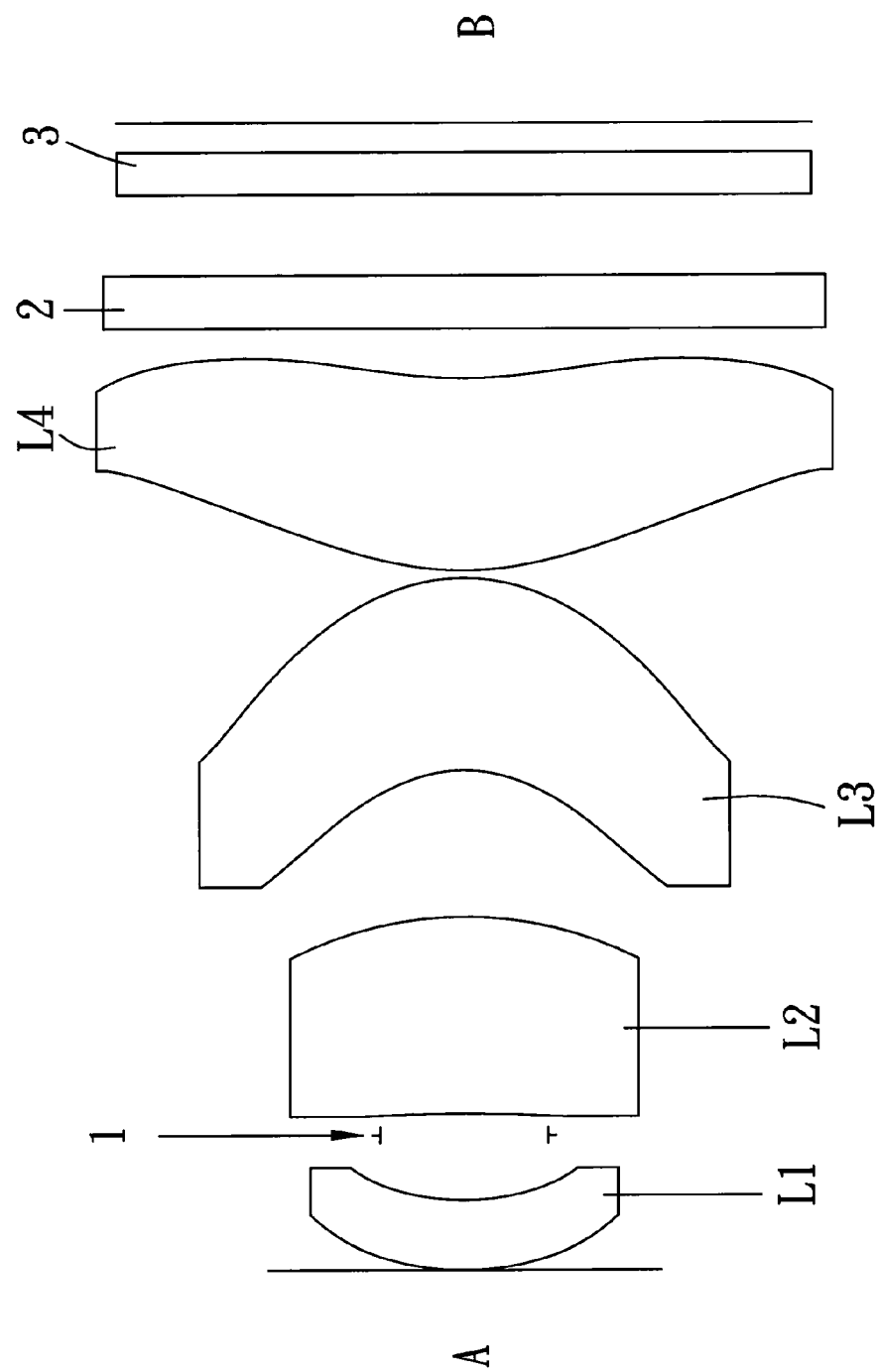
FIG. 1 is a schematic view showing an imaging lens module in accordance with a first preferred embodiment of the present invention.
Figure 2:
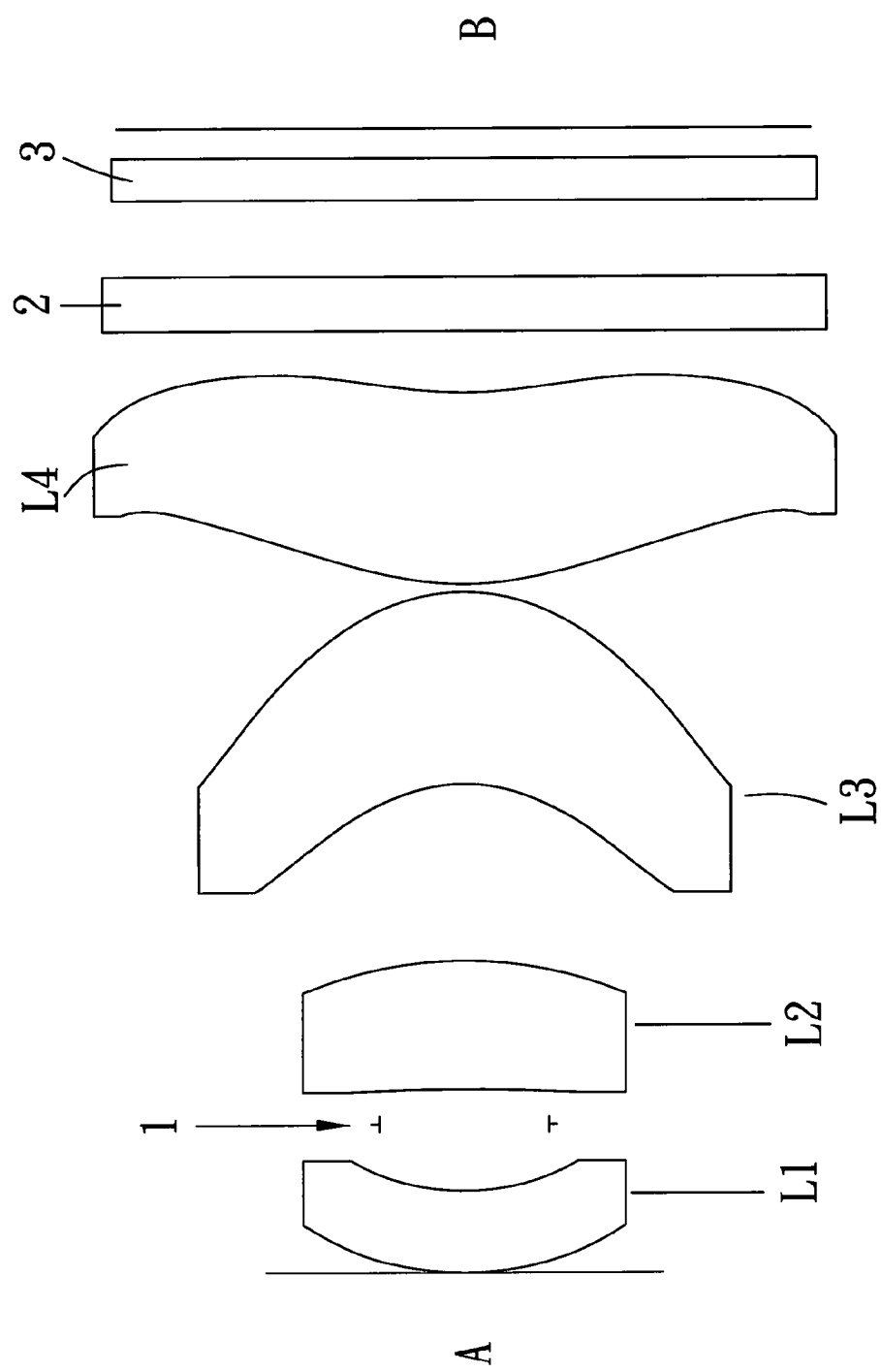
FIG. 2 is a schematic view showing an imaging lens module in accordance with a second preferred embodiment of the present invention.

FIG. 1 and FIG. 2 are schematic views respectively showing lens modules in accordance with the first and second preferred embodiments of the present invention which is a single focus wide-angle lens module disposed in front of an infrared sensor. In the preferred embodiments, each single focus wide-angle lens module includes a fixed aperture diaphragm 1, a first lens L1, a second lens L2, a third lens L3, and a fourth lens L4. Said lenses are arranged from an object side A to an image side B in the following sequence: the first lens L1, the fixed aperture diaphragm, the second lens L2, the third lens L3, and the fourth lens L4.

The first lens L1 has a concave surface toward the image side B, and an aspheric surface. The second lens L2 has a positive refractive power, and a concave surface toward the object side A. Further, the third lens L3 has a meniscus shape, a positive refractive power, and a concave surface toward the object side A. The fourth lens L4 has a positive refractive power, a convex surface toward the object side A, and at least one aspheric surface.

Above-mentioned optical module is composed of the four lens, and a first plane glass 2 is disposed behind the fourth lens L4 for infrared rays to transmit therethrough. In addition, a second plane glass 3 is installed in front of the image side B to protect the infrared sensor. For a better sensing effect, the quantity of the first plane glasses 2 and the second plane glasses 3 can be adjusted depending on infrared sensors of different installment structures. Moreover, the image side B is disposed with an infrared sensor.

In the lens module of the present invention, the second lens L2 is made of glass and the other lens can be made of glass or plastic material by demand. The higher stabilization, the higher transmittance, and the lower expansion coefficient of glass material can dramatically decrease the change in a focal length of the lens module by temperature, and make the single focus wide-angle lens module have more stabilized quality, more accurate sensing and receiving for the longitudinal depth. Thereby the present invention can fulfill the more comprehensive demands of 3D games. In the invention, the accurate sensing and receiving for the longitudinal depth can be applied not only to 3D games, but also to a TV switch sensor for a user to switch channels by waving his/her arm.

Figure 1A:
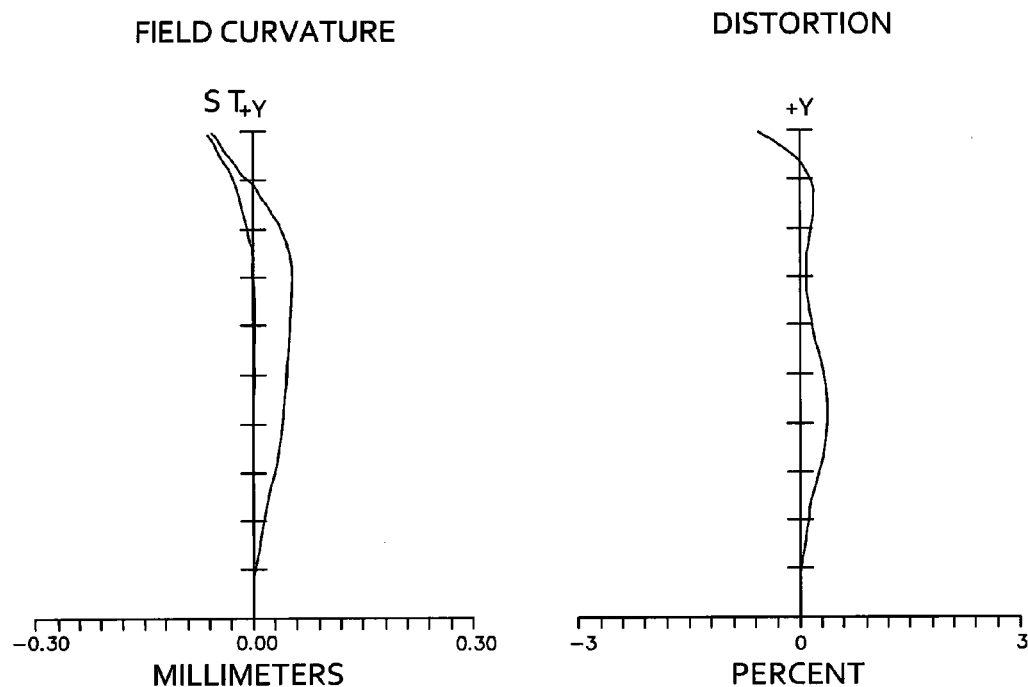
FIG. 1A is a schematic view showing the aberration of an imaging lens module in accordance with the first preferred embodiment of the present invention.
Figure 1A:
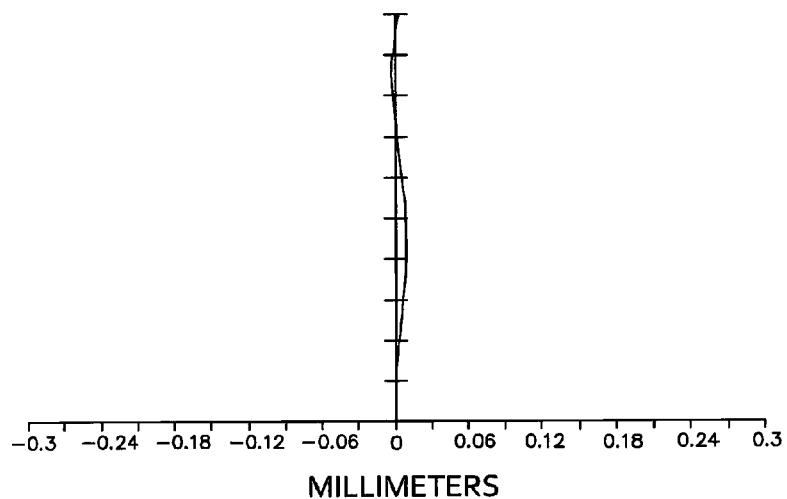
Figure 2A:
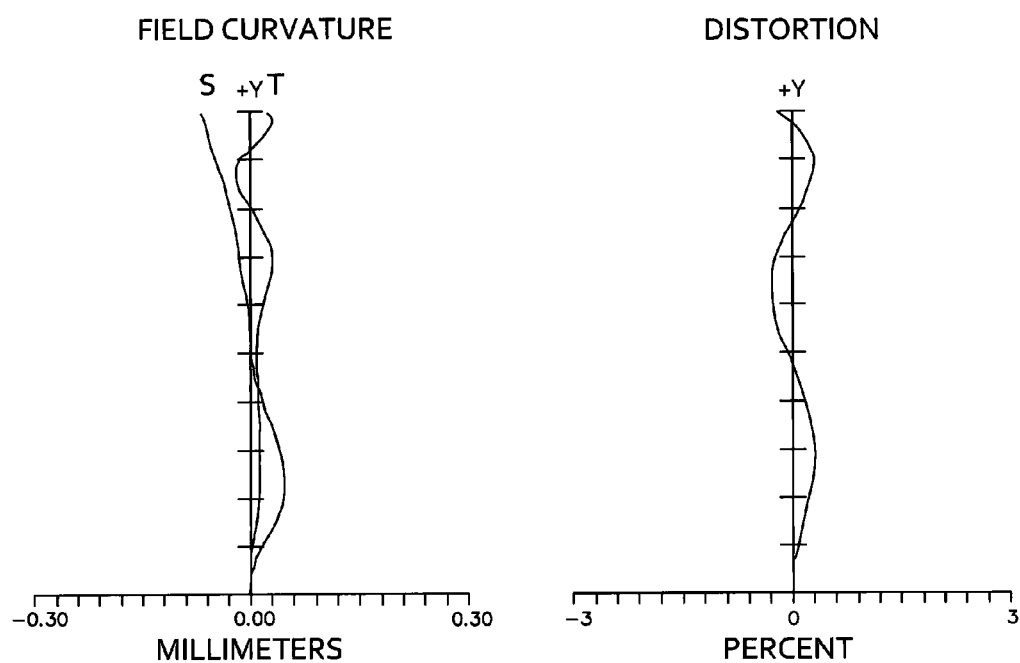
FIG. 2A is a schematic view showing a aberration of an imaging lens module in accordance with a second preferred embodiment of the present invention.
Figure 2A:
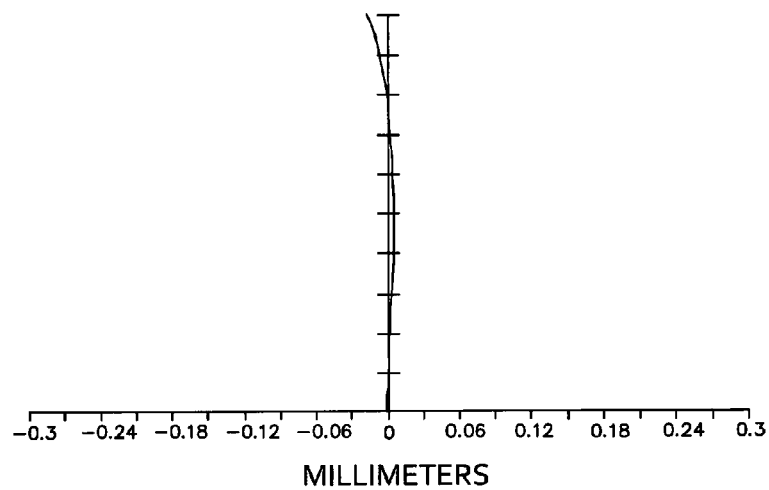

In addition, the schematic views of the aberration of the invention are non-point aberration, distorted aberration and spherical surface aberration as shown in FIG. 1A and FIG. 2A. Each aberration relates to the data of a line d, and the non-point aberration relates to the data of an S image plane (SAGITTAL) and a T image plane (TANGENTIAL). From the figures of the aberrations, the aberration correction of the invention is obtained completely from a simulated design, and thus there will be no problems in practical applications.

The FIG. 1B and FIG. 2B are the data of aspheric surface in accordance with the first and the second preferred embodiment of the invention, wherein the data displayed at the top shows numerals representing each lens of the optical module of the invention.

The value of F. No. shows the parameter of brightness. The smaller the value of F is, the higher the brightness is.

Viewing angle: 2ω.

Focal Length f: f is the overall focal length (mm) of the optical module, and 1, 2, 3, 4, 5, 6, 7, 8, 9, 10, 11, 12, 13 listed below are numbers of lens surfaces counted in a sequence from the object side. The surface numbers 1 and 2 represent two surfaces of the first lens L1, the surface numbers 4 and 5 represent two surfaces of the second lens L2, the surface numbers 6 and 7 represent two surfaces of the third lens L3, the surface numbers 8 and 9 represent two surfaces of the fourth lens L4, and 10, 11, 12 and 13 represent two surfaces of the first plane glass 2 and the second plane glass 3 respectively.

To improve conventional imaging lens modules of infrared sensors, the first lens L1 has a concave surface toward the image side B, the second lens L2 has a concave surface toward the object side A, the third lens L3 has a concave surface toward the object side A, and the fourth lens L4 has a convex surface toward the object side A.

In the present invention, the focal length value f2 of the second lens L2 and the focal length value f3 of the third lens L3 must satisfy the following relationship:

$$0<|f2|/|f3|<0.8$$

In the present invention, the focal length value f3 of the third lens L3 and the focal length value f4 of the fourth lens L4 must satisfy the following relationship:

$$0<|f3|/|f4|<4.0$$

In the present invention, the overall focal length value f12 of the first lens L1 and the second lens L2, and the overall focal length value f34 of the third lens L3 and the fourth lens L4 must satisfy the following relationship:

$$0.2<|f12|/|f34|<3$$

In the present invention, the overall focal length value f234 of the second lens L2, the third lens L3 and the fourth lens L4, and the focal length value f of the whole lens module must satisfy the following relationship:

$$|f234|/|f|<2$$

Also, the focal length value f of the whole lens module and the distance TL between a first surface of the first lens and an imaging surface must satisfy the following relationship:

$$0.1<|f/TL|<0.8$$

If the above relationship is not satisfied, the performance, the resolving power and the yield rate of the lens module will be decreased.

Since every lens of the lens module has at least one aspheric surface, the shape of the aspheric surface must satisfy the condition of the following formula:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

Where, z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

In the single focus wide-angle lens module of the present invention, the coordination of the first and second lenses and the coordination of the third and fourth lenses enable the lens module to obtain wider viewing angle, i.e. the detecting angle which has reached at least 70 degrees and maintain the resolving power of the lens module as well.

In comparison to the conventional wide-angle lens module having larger chief ray angle, the present invention has successfully lowered the chief ray angle to approach 0 degree, so as to meet the product installation requirements.

Moreover, the four lenses can be all aspheric lenses, and perfectly, the second lens is made of glass. The aspheric lenses can improve the imaging resolution of a focusing. The second lens made of glass material can further prevent from the change of a focal length by high temperature, and can provide a better imaging effect for longitudinal depth.

What is claimed is:

1. A single focus wide-angle lens module, comprising a fixed aperture diaphragm, a first lens, a second lens, a third lens and a fourth lens, arranged from an object side to an image side in the following sequence:

the first lens, having a negative refractive power and a concave surface toward the image side and at least one aspheric surface;

the fixed aperture diaphragm;

the second lens, having a positive refractive power and a concave surface toward the object side, the second lens being made of glass;

the third lens, having a meniscus shape, a positive refractive power, a concave surface toward the object side, and at least one aspheric surface; and the fourth lens, having a positive refractive power, a convex surface toward the object side, and at least one aspheric surface, wherein $0<|f2|/|f3|<0.8$, and f2 is a focal length value of the second lens, f3 is a focal length value of the third lens.

2. The lens module of claim 1, wherein $0<|f3|/|f4|<4.0$, and f3 is a focal length value of the third lens, f4 is focal length value of the fourth lens.

3. The lens module of claim 2, wherein $0.2<|f12|/|f34|<3$, and F12 is an overall focal length value of the first lens and the second lens, f34 is an overall focal length value of the third lens and the fourth lens.

4. The lens module of claim 3, wherein $|f234|/|f|<2$, and f234 is an overall focal length value of the second lens, the third lens and the fourth lens, f is a focal length value of the whole lens module.

5. The lens modules of claim 4, wherein the aspheric surface is in a shape satisfying the following formula:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

and z is a value of a reference position based on a surface vertex along the optical axis at a height of h; k is a conic constant; c is the reciprocal of a radius of curvature; and A, B, C, D, E, G . . . are coefficients of high-level aspheric surfaces.

6. The lens module of claim 1, wherein $0.2<|f12|/|f34|<3$, and F12 is an overall focal length value of the first lens and the second lens, f34 is an overall focal length value of the third lens and the fourth lens.

7. The lens module of claim 1, wherein $|f234|/|f|<2$, and f234 is an overall focal length value of the second lens, the third lens and the fourth lens, f is a focal length value of the whole lens module.

8. The lens module of claim 1, wherein $0.1<|f/TL|<0.8$, and TL is the distance from a first surface of the first lens to the image side, f is a focal length value of the whole lens module.

* * * * *